(12) United States Patent
Zhang et al.

(10) Patent No.: US 11,371,348 B2
(45) Date of Patent: Jun. 28, 2022

(54) PIPELINE ANNULAR SELF-TRAVELING GUIDE APPARATUS AND METHOD

(71) Applicants: CHINA RAILWAY TUNNEL GROUP CO., LTD., Guangzhou (CN); CHINA RAILWAY TUNNEL STOCK CO., LTD., Zhengzhou (CN)

(72) Inventors: Yanwei Zhang, Zhengzhou (CN); Xinpeng Hu, Zhengzhou (CN); Feng Li, Zhengzhou (CN); Li Huang, Zhengzhou (CN); Guohong Ren, Zhengzhou (CN); Dabing Che, Zhengzhou (CN); Wenjuan Wu, Zhengzhou (CN); Qingjun Zheng, Zhengzhou (CN); Wenhuan Cao, Zhengzhou (CN); Bin Chen, Zhengzhou (CN); Yukai Luo, Zhengzhou (CN); Xiaoli Li, Zhengzhou (CN); Renyu Wen, Zhengzhou (CN)

(73) Assignees: CHINA RAILWAY TUNNEL GROUP CO., LTD., Guangzhou (CN); CHINA RAILWAY TUNNEL STOCK CO., LTD., Zhengzhou (CN)

( * ) Notice: Subject to any disclaimer, the term of this patent is extended or adjusted under 35 U.S.C. 154(b) by 0 days.

(21) Appl. No.: 17/370,292

(22) Filed: Jul. 8, 2021

(65) Prior Publication Data
US 2021/0332702 A1    Oct. 28, 2021

Related U.S. Application Data

(63) Continuation of application No. PCT/CN2020/098377, filed on Jun. 28, 2020.

(30) Foreign Application Priority Data

Jul. 3, 2019   (CN) .......................... 201910596305.6

(51) Int. Cl.
*E21D 9/06* (2006.01)
*F16L 1/028* (2006.01)

(52) U.S. Cl.
CPC ............ *E21D 9/0607* (2013.01); *F16L 1/028* (2013.01)

(58) Field of Classification Search
CPC ..... E21D 9/0607; E21D 9/0621; E21D 9/093; E21D 9/06; E21D 9/0609; F16L 1/028
See application file for complete search history.

(56) References Cited

U.S. PATENT DOCUMENTS 4,143,519 A  *  3/1979  Unger ................... E21D 9/0607
                                                       405/145
4,557,627 A  *  12/1985  Schmid ................. E21D 9/0635
                                                       405/145
(Continued)

FOREIGN PATENT DOCUMENTS

CN       102400692 A     4/2012
CN       105443136 A     3/2016
(Continued)

OTHER PUBLICATIONS

International Search Report and Written Opinion issued in corresponding PCT Application No. PCT/CN2020/098377, dated Sep. 28, 2020.

*Primary Examiner* — Benjamin F Fiorello
(74) *Attorney, Agent, or Firm* — Westbridge IP LLC

(57) ABSTRACT

The application discloses a pipeline annular self-traveling guide apparatus and a pipeline annular self-traveling guiding method. The pipeline annular self-traveling guide apparatus includes an inner annular groove and an outer annular groove. A first pipeline fixing part is configured on the inner annular groove, a second pipeline fixing part is configured on the outer annular groove, an annular bracket which is configured to rotate freely along a circumferential direction (Continued)

is correspondingly configured between the inner annular groove and the outer annular groove, a pipeline supporting roller group is configured on the annular bracket, and gaps for laying pipelines are reserved between a circumferential surface of the pipeline supporting roller and inner bottom surfaces of the inner annular groove and the outer annular groove.

10 Claims, 14 Drawing Sheets

(56) References Cited

U.S. PATENT DOCUMENTS

| | | | | |
|---|---|---|---|---|
| 4,624,605 | A * | 11/1986 | Akesaka | E21D 9/0621 |
| | | | | 405/184 |
| 4,793,736 | A * | 12/1988 | Thompson | E21D 9/0873 |
| | | | | 405/141 |
| 9,512,874 | B2 * | 12/2016 | Hennig | F01D 25/164 |
| 9,605,709 | B2 * | 3/2017 | Kaesler | F16C 33/6659 |
| 2004/0108139 | A1 * | 6/2004 | Davies | E21D 9/093 |
| | | | | 299/56 |
| 2014/0010492 | A1 * | 1/2014 | Bouron | E21D 9/06 |
| | | | | 384/608 |

FOREIGN PATENT DOCUMENTS

| | | |
|---|---|---|
| CN | 206889918 U | 1/2018 |
| CN | 110273690 A | 9/2019 |
| CN | 210598974 U | 5/2020 |
| JP | 2005009099 A | 1/2005 |

* cited by examiner

US 11,371,348 B2

PIPELINE ANNULAR SELF-TRAVELING GUIDE APPARATUS AND METHOD

CROSS REFERENCE TO RELATED APPLICATIONS

This application is a continuation of International Application No. PCT/CN2020/098377, filed Jun. 28, 2020, which claims priority to Chinese patent application No. 201910596305.6 filed on Jul. 3, 2019, which are hereby incorporated by reference in their entireties.

FIELD

The application relates to the technical field of segment assemblers of shield machines, in particular to a pipeline annular self-guiding apparatus and a pipeline annular self-guiding method.

BACKGROUND

Shield machine is a kind of large-scale construction machinery for tunnel construction. Segment assembler is an important part of a shield machine. After the cutter head of the shield machine advances forward and excavates for a certain distance, the segment assembler splices prefabricated segments into tunnel lining to protect the surface of the excavated tunnel and prevent local collapse and water leakage of the tunnel.

FIG. 1 is a structural diagram of a conventional segment assembling machine, a turntable 103 is rotatably mounted on a supporting beam inside a shield machine, the turntable 103 is configured with inner teeth, and a driving gear 104 matched with the inner teeth is configured, and the driving gear 104 can be driven by a motor or a hydraulic motor. A snatching bracket 105 is mount on the turntable 103, and the snatching bracket 105 is mount on two supporting arms 106 by a sleeve slide bar mechanism. A low portion of the snatching bracket 105 is configured with a segment snatching head 100. The turntable 103 can move axially on the supporting beam inside the shield machine, and the turntable 103 can rotate circumferentially under a driving of the driving gear 104, while the snatching bracket 105 can move radially under a driving of a first hydraulic cylinder 101 and a second hydraulic cylinder 102. Therefore, the segment snatching head 100 has six degrees of freedom, and segments grasped by the segment grasping head 100 can be conveniently installed at corresponding positions in a tunnel.

The segment snatching head 100 in FIG. 1 is also configured with some hydraulic cylinders to satisfy the segment snatching head 100 to perform swinging, up and down movement and other actions. All hydraulic cylinders including the first hydraulic cylinder 101 and the second hydraulic cylinder 102 needs to be able to rotate with the turntable 103, and hydraulic oil pipelines connected to each hydraulic cylinder are configured to rotate together. Due to a large number of hydraulic oil pipelines, it is easy to cause the hydraulic oil pipelines to be wound with each other, or the hydraulic oil pipelines are wound on some parts of the segment assembling machine.

Based on the above reasons, it is necessary to provide an apparatus that can arrange and position each hydraulic oil pipeline on the segment assembling machine in rotating operation without affecting the normal operation of the segment assembling machine.

SUMMARY

The application aims to provide a pipeline annular self-guiding apparatus and method, and to solve the technical problem that a hydraulic pipeline of a segment assembling machine of a shield machine is easy to be wound in the related art.

In order to solve the above technical problems, a first aspect of the present application is provided.

A pipeline annular self-traveling guide apparatus including an inner annular groove and an outer annular groove is designed, the inner annular groove and the outer annular groove are coaxially configured, where a cutout of the outer annular groove is facing radially inward, a cutout of the inner annular groove is facing radially outward, the cutout of the outer annular groove is opposite to the cutout of the inner annular groove;

the inner annular groove is configured with a first pipeline fixing part, the outer annular groove is configured with a second pipeline fixing part, the first pipeline fixing part is configured with a pipeline inlet hole communicated with the inner annular groove, and the second pipeline fixing part is configured with a pipeline outlet hole communicated with the outer annular groove;

between the inner annular groove and the outer annular groove an annular bracket configured to freely rotate along a circumferential direction is correspondingly configured, a pipeline supporting roller group is configured on the annular bracket, the pipeline supporting roller group includes a plurality of pipeline supporting rollers configured at intervals along a circumferential direction and is configured to rotate freely by themselves, central axes of the pipeline supporting rollers are parallel to central axes of the inner annular groove and the outer annular groove, and gaps for laying pipelines are reserved between a circumferential surface of the pipeline supporting roller and the groove inner bottom surfaces of the inner annular groove and the outer annular groove.

Optionally, the annular bracket is also configured with a large roller group, the large roller group includes a plurality of large rollers configured at intervals along a circumferential direction and is configured to rotate freely, central axes of the large rollers are parallel to the central axes of the inner annular groove and the outer annular groove, and a circumferential surface of the large rollers are attached to inner bottom surfaces of the inner annular groove and the outer annular groove.

Optionally, the annular bracket includes two coaxially configured supporting rings, the two supporting rings are configured at intervals along the axial direction, and ends of the rotating shaft of the pipeline supporting rollers are respectively correspondingly installed on the two supporting rings.

Optionally, groove widths of the inner annular groove and the outer annular groove are the same, a radial gap for installing the supporting rings is reserved between a side surface of the inner annular groove and a side surface corresponding to the outer annular groove, and a radial width of the supporting rings is smaller than a radial width of the radial gap.

Optionally, diameters of the pipeline supporting rollers are larger than the radial width of the radial gap, an axial width of the pipeline supporting rollers are slightly smaller than the groove widths of the inner annular groove and the outer annular groove, and the pipeline supporting rollers are locally located in the inner annular groove and locally located in the outer annular groove.

Optionally, a first cutout is configured on an inner wall surface of the inner annular groove, a second cutout is configured on an outer wall surface of the outer annular groove, and the second cutout is located on an opposite side of the first cutout. The first pipeline fixing part is installed on the first cutout, and the second pipeline fixing part is installed on the second cutout.

Optionally, the first pipeline fixing part and the second pipeline fixing part both include an upper pressing plate and a lower pressing plate, the upper pressing plate and the lower pressing plate are connected by bolts, and a distance between the upper pressing plate and the lower pressing plate can be adjusted by screwing the bolts; the lower pressing plate of the first pipeline fixing part is fixed at a bottom of the first cutout, and the first cutout has a certain depth radially outward on the inner wall surface of the inner annular groove for penetrating the pipeline from between the lower pressing plate and the upper pressing plate of the first pipeline fixing part to a side of the first cutout; the lower pressing plate of the second pipeline fixing part is fixed at the bottom of the second cutout, and the second cutout has a certain depth inward along a radial direction on the outer wall surface of the outer annular groove, so as to penetrate the pipeline from a side surface of the second cutout to a space between the lower pressing plate and the upper pressing plate of the second pipeline fixing part.

Optionally, the inner annular groove and/or the outer annular groove are configured with a stopper for preventing the large roller from passing through but not preventing the pipeline supporting rollers from passing through, and the stopper is located beside the first pipeline fixing part and is located on an opposite side of a penetrating pipeline.

Optionally, the pipeline annular self-guiding apparatus of a pipeline according to claim 1, the inner annular groove and the outer annular groove are butted by a plurality of arc grooves.

A second aspect is the present application is provided.

A pipeline annular self-guiding method is provided, the method adopts the pipeline annular self-guiding apparatus according to any one of the embodiments, and the method includes:

conducting a plurality of pipelines into the inner annular groove through the pipeline inlet hole, conducting each of the pipelines to move forward along a gap between the pipeline supporting rollers and a groove bottom surface of the inner annular groove to pass by some of the pipeline supporting rollers and then fold back, and after the pipelines are folded back, conducting each of the pipelines moved forward along a gap between the pipeline supporting rollers and a groove bottom surface of the outer annular groove to a pipeline exit hole and out from the pipeline exit hole;

configuring each of the pipelines side by side in the gap between the pipeline supporting rollers and the groove bottom surface of the inner annular groove, and in a gap between the pipeline supporting roller and the bottom surface of the outer annular groove;

reserving appropriate lengths for each pipeline outside the pipeline inlet hole and a pipeline outlet hole; and fixing each of the pipelines at the first pipeline fixing part and the second pipeline fixing part;

where the inner annular groove is fixed, and the outer annular groove and the annular bracket are rotatable freely.

The beneficial technical effects of the application are as the followings:

1. The pipeline annular self-guiding apparatus configured by the application can be used to guide a plurality of pipelines requiring one end to be fixed and the other end to move along the circumferential direction, so as to prevent winding between pipelines. For example, when the pipeline annular self-guiding apparatus provided by the application is used for guiding a hydraulic oil pipeline of a hydraulic oil cylinder of a segment assembling machine, although the hydraulic oil cylinder of the segment assembling machine rotates in the circumferential direction, the hydraulic oil pipelines can always be connected with the hydraulic oil cylinder under the guidance of the pipeline annular self-guiding apparatus, and the hydraulic oil pipelines are configured neatly without winding.

2. Using the pipeline annular self-guiding apparatus provided by the application, the rotation angle range of a movable end of the pipeline is positive and negative 190 degrees, which can meet a rotation angle range of the segment assembling machine of the shield machine.

DETAILED DESCRIPTION OF THE EMBODIMENTS

Figure 1:
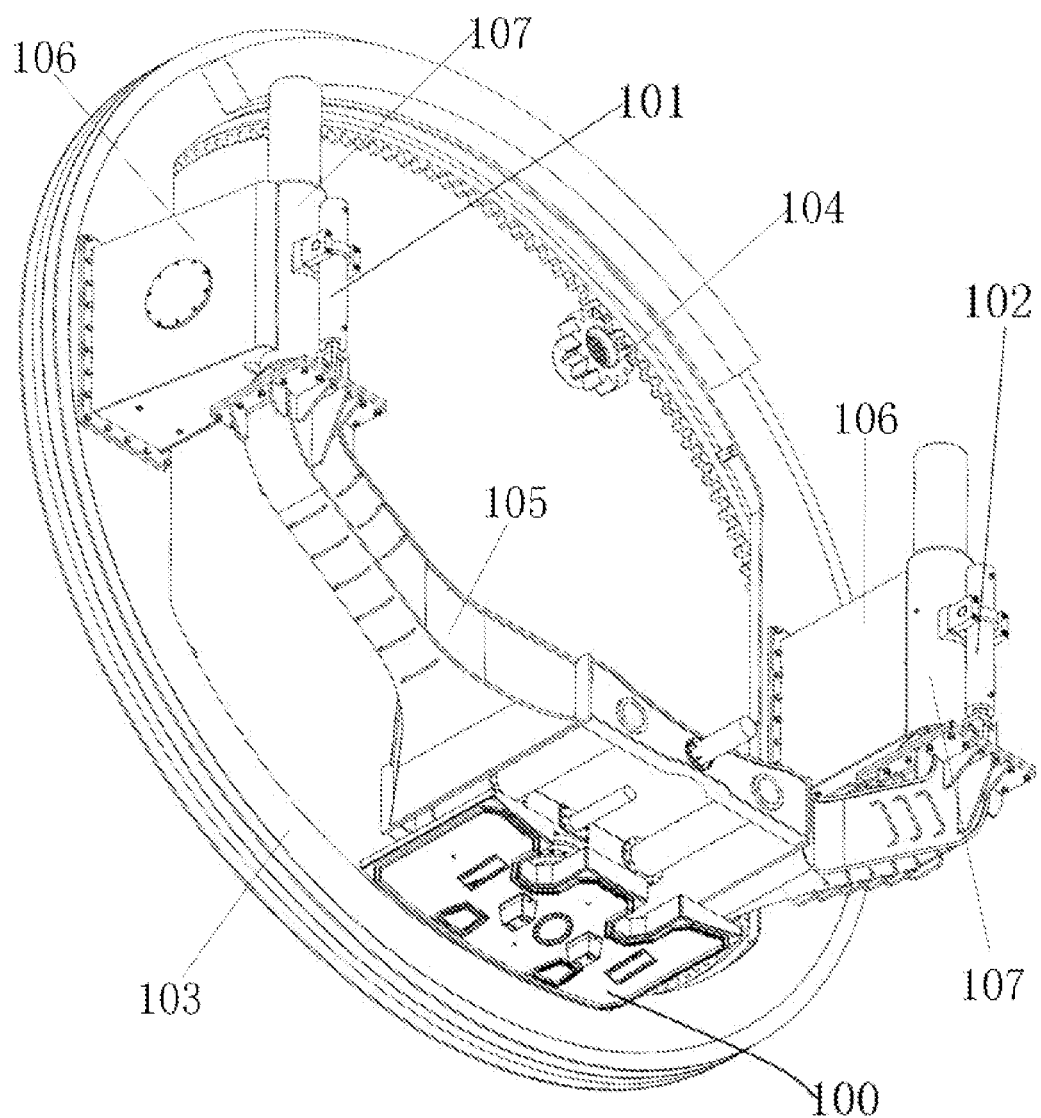
FIG. 1 is a structural schematic view of an existing segment assembling machine.
Figure 2:
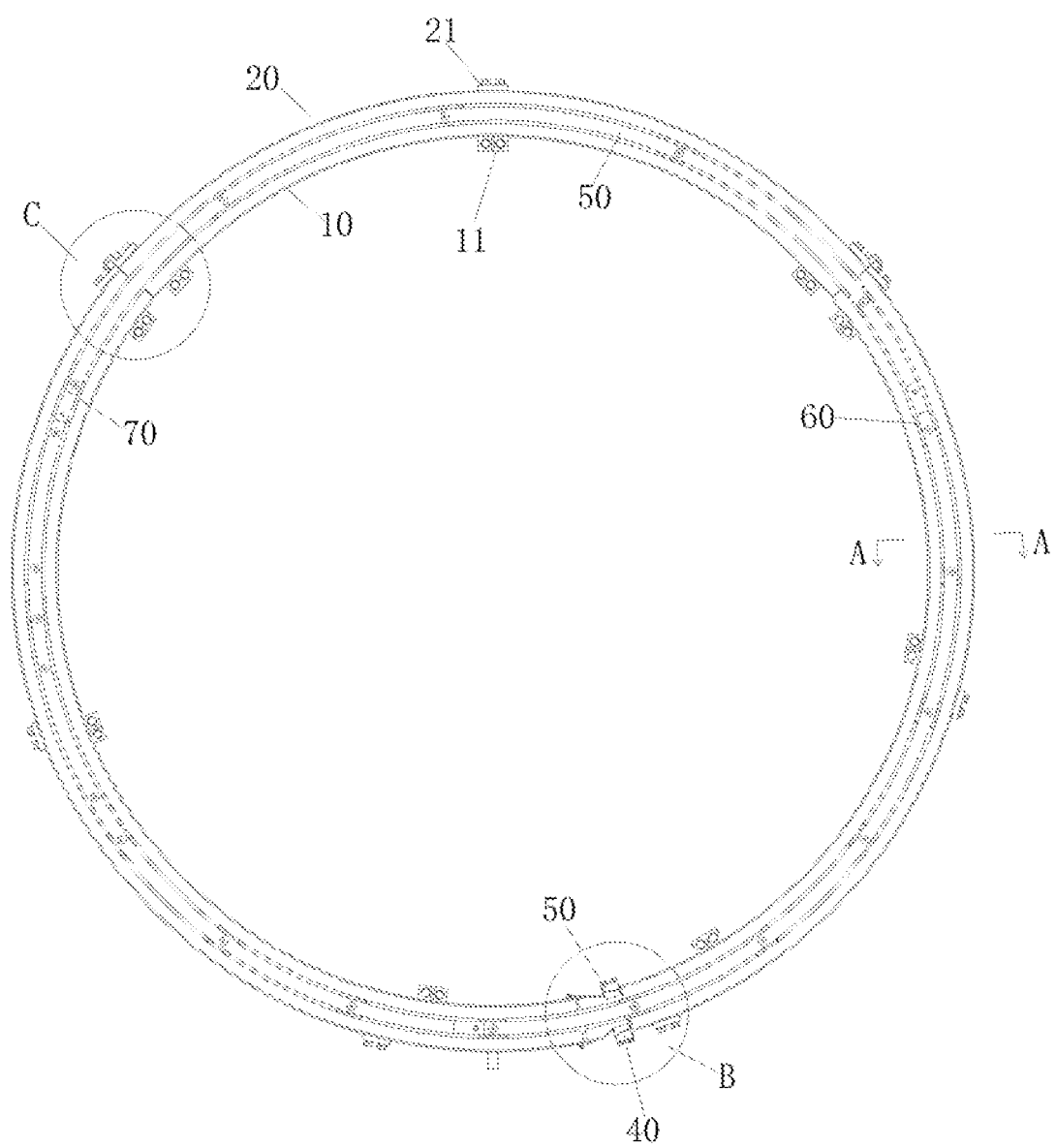
FIG. 2 is a front view of a pipeline annular self-guiding apparatus according to embodiment 1 of the present application.
Figure 3:
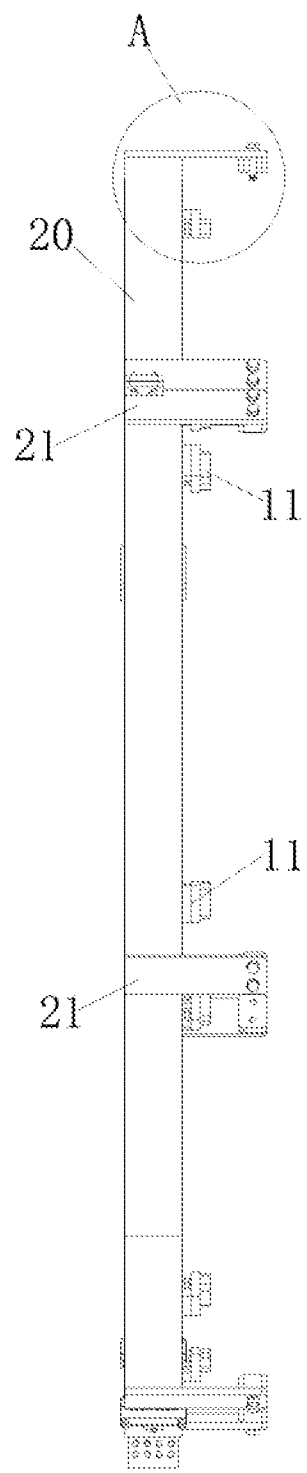
FIG. 3 is a left side view of the pipeline annular self-guiding apparatus according to embodiment 1 of the present application.

Detailed Description of the preferred embodiments of the present application will be described below with reference to the accompany drawings and examples, but the following examples are intended only to illustrate applications in detail and are not intended to limit the scope of the application in any way.

In the description of the application, it should be understood that, the terms "upper", "lower", "front", "rear", "left", "right", "top", "bottom", "inner", "outer" and the like indicate orientational or positional relationships based on the orientational or positional relationships shown in the drawings, those terms are for purposes of convenience and simplification of the description of the application, and not intended to indicate or imply that the apparatus or element referred must have a specific orientation, be constructed and operated in a specific orientation, and therefore those terms cannot be construed as limiting the present application.

Embodiment 1

See FIG. 2 to FIG. 11. According to FIG. 2, a pipeline annular self-guiding apparatus provided by the embodiment of the present application includes an inner annular groove 10 and an outer annular groove 20 which are coaxially configured. Both the inner annular groove 10 and the outer annular groove 20 are in annular shapes, an opening of the outer annular groove 20 faces radially inward, an opening of the inner annular groove 10 faces radially outward, and the opening of the outer annular groove 20 faces the opening of the inner annular groove 10.

When the pipeline annular self-guiding apparatus is installed on a segment assembling machine for usage, the outer annular groove 20 receives an outer ring of a large bearing of the segment assembling machine, and the inner annular groove 10 receives an inner ring of the large bearing of the segment assembling machine. The inner ring of the large bearing of the segment assembling machine is fixed, so that the inner annular groove 10 does not rotate, while the outer annular groove 20 is configured to rotate with the outer ring of the large bearing of the segment assembling machine.

In this embodiment, the inner annular groove 10 is configured with a plurality of inner fixing seats 11 along a circumferential direction, and the outer annular groove 20 is configured with a plurality of outer fixing bases 21 along a circumferential direction. The outer annular groove 20 is fixed with the outer ring of the large bearing of the segment assembling machine through the outer fixing bases 21, and the inner annular groove 10 is fixed with an inner ring of the large bearing of the segment assembling machine through the inner fixing seats 11. That is, the outer fixing bases are configured for fixing the outer ring of the large bearing of the segment assembling machine in the outer annular groove 20, and the inner fixing seats 11 are configured for fixing the inner ring of the large bearing of the segment assembling machine in the inner annular groove 10. In other embodiments, the inner annular groove 10 and the outer annular groove 20 may also be mounted by welding or by placing brackets on the large bearings, that is, the inner annular groove 10 and the outer annular groove 20 may receive and fix the large bearing by welding or by using brackets.

Figure 4:
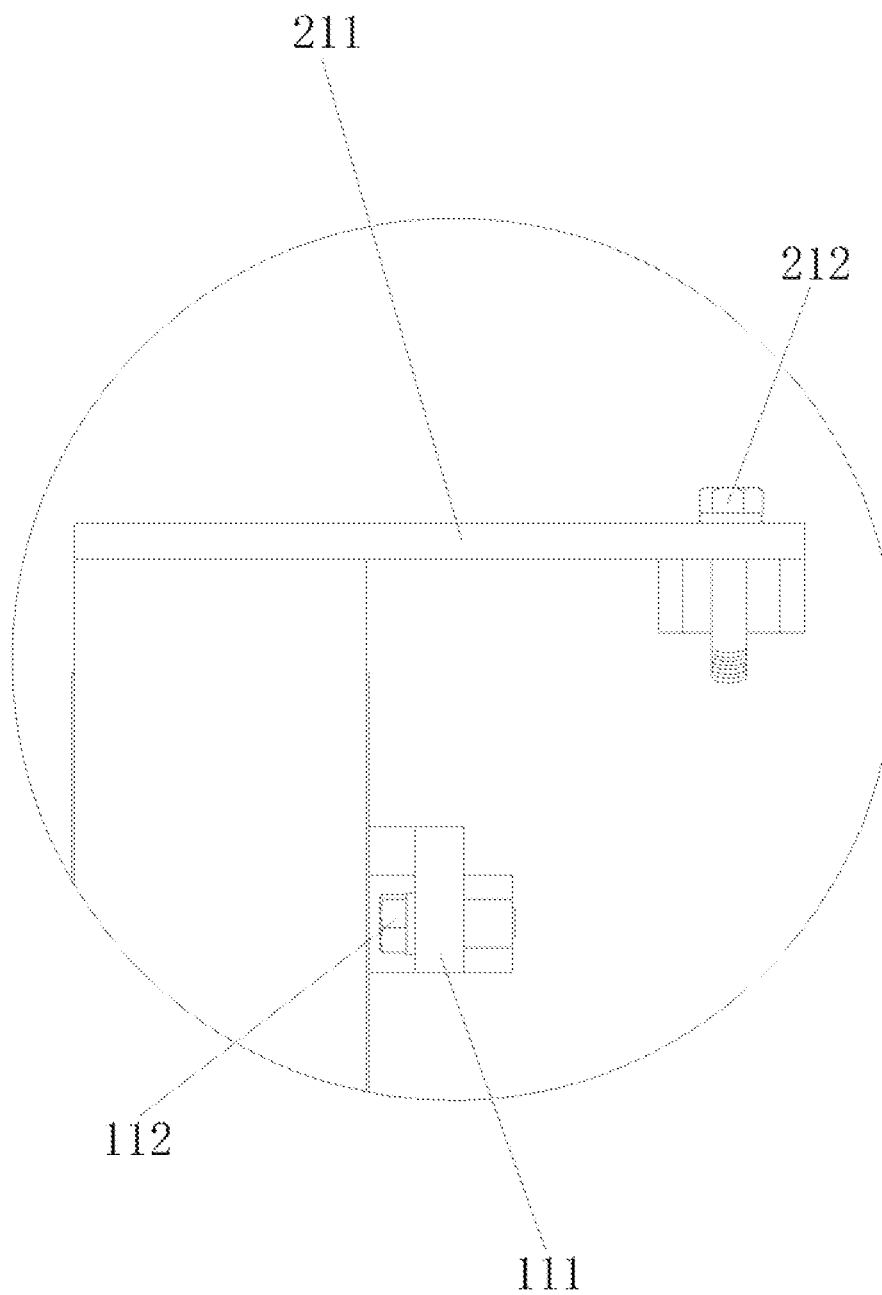
FIG. 4 is an enlarged view of part A of FIG. 3.

Further, according to FIG. 4, each inner fixing seat 11 includes an inner mounting plate 111, and an axial bolt 112 is configured on the inner mounting plate 111, and the inner annular groove 10 is fixed to a side surface of the inner ring of the large bearing by the axial bolt 112. That is, the inner ring of the large bearing is fixed in the inner annular groove 10 by the axial bolt 112. Each outer fixing base 21 includes an outer mounting plate 211, on which a radial bolt 212 is configured, and the radial bolt 212 are tightened on an outer circumferential surface of the outer ring of the large bearing, thereby fixing the outer ring of the large bearing in the outer annular groove 20.

The inner annular groove 10 is configured with a first pipeline fixing part 30, and the outer annular groove 20 is configured with a second pipeline fixing part 40. The first pipeline fixing part 30 is defined with a pipeline inlet hole communicating with the inner annular groove 10, and the second pipeline fixing part 40 is defined with a pipeline outlet hole communicating with the outer annular groove 20.

An annular bracket 50 configured to rotate freely along a circumferential direction is configured between the inner annular groove 10 and the outer annular groove 20, and a pipeline supporting roller group and a large roller group are configured on the annular bracket 50. In this embodiment, the pipeline supporting roller group includes eleven pipeline supporting rollers 60, the large roller group includes five large rollers 70. Central axes of the pipeline supporting rollers 60 and the large rollers 70 are parallel to central axes of the inner annular groove 10 and the outer annular groove 20. The annular bracket 50 is configured for supporting each pipeline supporting roller and each large roller. When the annular bracket 50 rotates along the circumferential direction, the annular bracket 50 can drive the pipeline supporting rollers 60 and the large rollers 70 to rotate along the circumferential direction. Furthermore, the pipeline supporting rollers 60 and the large rollers 70 themselves can freely rotate.

Figure 5:
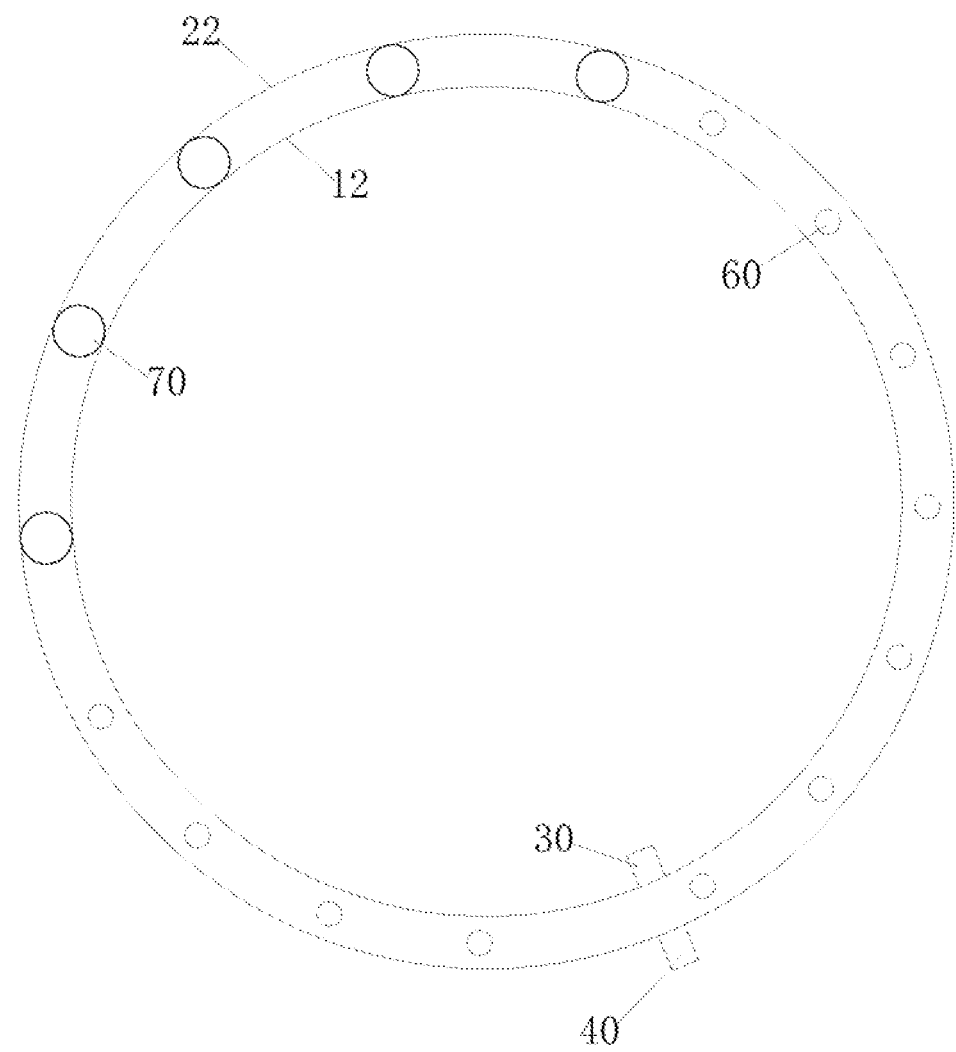
FIG. 5 is a schematic diagram of a distribution of pipeline supporting roller groups and large roller groups in the pipeline annular self-guiding apparatus according to embodiment 1 of the present application.

A distribution mode of the pipeline supporting roller group and the large roller group is shown in FIG. 5. The pipeline supporting rollers 60 are sequentially arranged adjacent to each other in the circumferential direction, and the large roller 70 are sequentially arranged adjacent to each other in the circumferential direction. An interval between every two adjacent pipeline supporting rollers 60 is 22.5 degrees, and an interval between every two adjacent large rollers 70 is 22.5 degrees. Seven of the eleven pipeline supporting rollers 60 are located on a right side of the first pipeline fixing part 30, and four of the eleven pipeline supporting rollers 60 are located on a left side of the first pipeline fixing part 30.

According to FIG. 5, a gap is defined between a circumferential surface of each pipeline supporting roller 60 and an inner bottom surface 12 of the inner annular groove 10, and a gap is defined between the circumferential surface of each pipeline supporting roller 60 and an inner bottom surface 22 of each outer annular groove 20. The gaps are for laying pipelines. A width of each gap in a radial direction is the same as a diameter of a hydraulic oil pipe, i.e., a diameter of the pipeline supporting roller 60 plus twice of the diameter of the hydraulic oil pipeline is equal to a radial distance between the inner bottom surface 12 of the inner annular groove 10 and the inner bottom surface 22 of the outer annular groove 20. A circumferential surface of each large roller 70 is in contact with both the inner bottom surface 12 of the inner annular groove 10 and the inner bottom surface 22 of the outer annular groove 20, i.e. a diameter of the large roller 70 is equal to the radial distance between the inner bottom surface 12 of the inner annular groove 10 and the inner bottom surface 22 of the outer annular groove 20.

In this embodiment, the hydraulic oil pipeline can be inserted into the inner annular groove 10 through the pipeline inlet hole of the first pipeline fixing part 30, the hydraulic oil pipeline is then advanced along the gaps between the seven of the pipeline supporting rollers 60 on the right side of the first pipeline fixing part 30 and the inner bottom surface 12 of the inner annular groove 10. The hydraulic oil pipeline is turned back after passing the last pipeline supporting roller 60, and then is advanced along the gaps between the seven pipeline supporting rollers 60 on the right side of the first pipeline fixing part 30 and the inner bottom surface 22 of the outer annular groove 20. Finally, the hydraulic oil pipeline is passed through the pipeline outlet hole of the second pipeline fixing part 40. Each hydraulic oil pipeline has proper lengths reserved outside the pipeline inlet hole and the pipeline outlet hole, and each hydraulic oil pipeline is fixed at the first pipeline fixing part 30 and the second pipeline fixing part 40.

Since the outer annular groove 20 rotates with the outer ring of the large bearing of the segment assembling machine, the second pipeline fixing part 40 can keep a positional relationship with each hydraulic cylinder on the segment assembling machine unchanged. A position relationship between each hydraulic oil pipelines passing through the second pipeline fixing part 40 and each hydraulic oil cylinder is unchanged, and the hydraulic oil pipelines can always supply oil to the hydraulic oil cylinders of the segment assembling machine, and the hydraulic oil pipelines are kept in an orderly arrangement in the inner annular groove 10 and the outer annular groove 20 to prevent winding between the hydraulic oil pipelines.

Therefore, although the segment assembling machine needs to rotate in the circumferential direction after grabbing a segment, and each hydraulic cylinder on the segment assembling machine needs to change its spatial position accordingly, however, each hydraulic oil pipeline passing through the second pipeline fixing part 40 can always be used to supply oil to each hydraulic cylinder on the segment assembling machine.

Specifically, as the outer annular groove 20 rotates, the inner bottom surface 22 of the outer annular groove 20 can drive the large roller 70 to roll, and the inner bottom surface 22 of the outer annular groove 20 can also drive the hydraulic oil pipelines in contact with it to move, the pipeline supporting rollers 60 in contact with the hydraulic oil pipelines roll accordingly. The rolling large roller 70 and the rolling pipeline supporting roller 60 can drive the annular bracket 50 to rotate in the circumferential direction. The pipeline supporting rollers 60 on the annular bracket 50 can further drive the hydraulic pipelines to move between the inner annular groove 10 and the outer annular groove 20. A length of the hydraulic oil pipeline wound in the inner annular groove 10 and the outer annular groove 20 is constant. When the second pipeline fixing part 40 changes its position in the circumferential direction, the hydraulic pipelines in the inner annular groove 10 and the outer annular groove 20 can always follow up and change to a corresponding posture.

Figure 6:
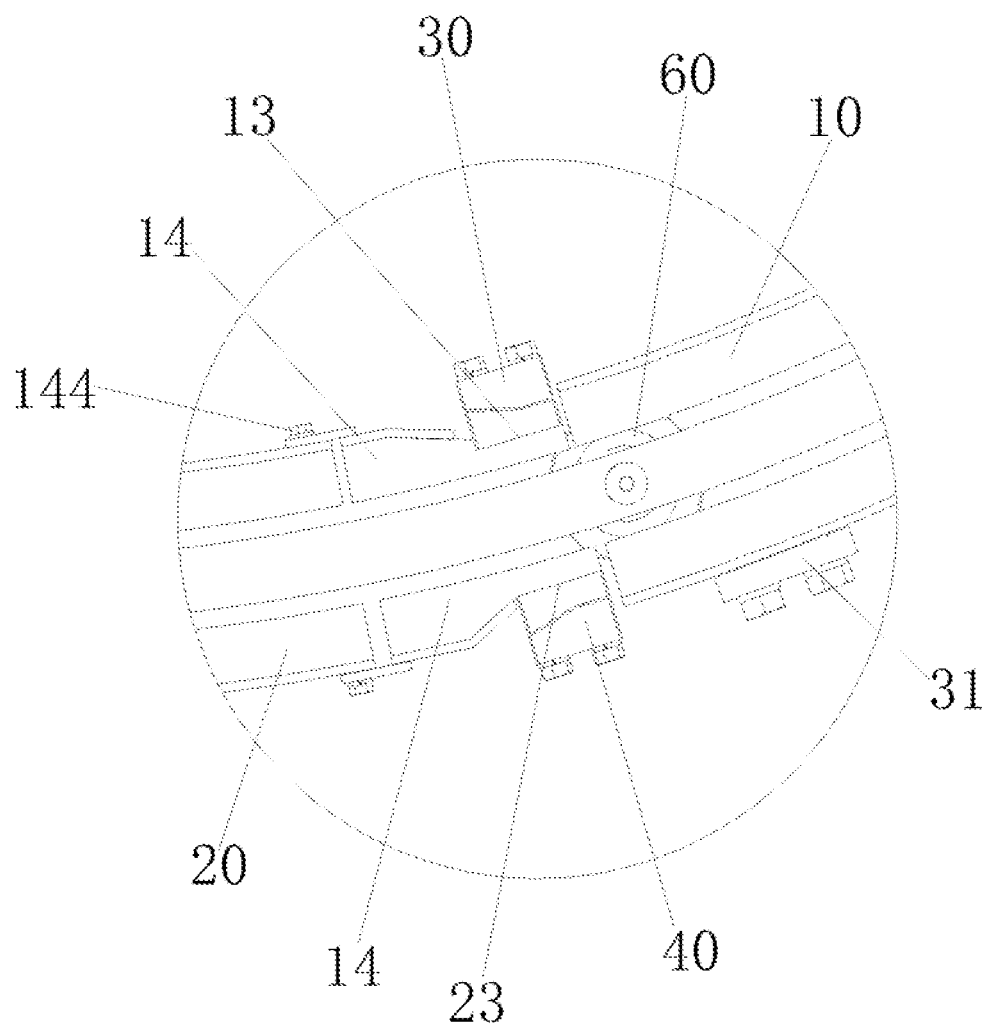
FIG. 6 is an enlarged view of part B of FIG. 2.
Figure 7:
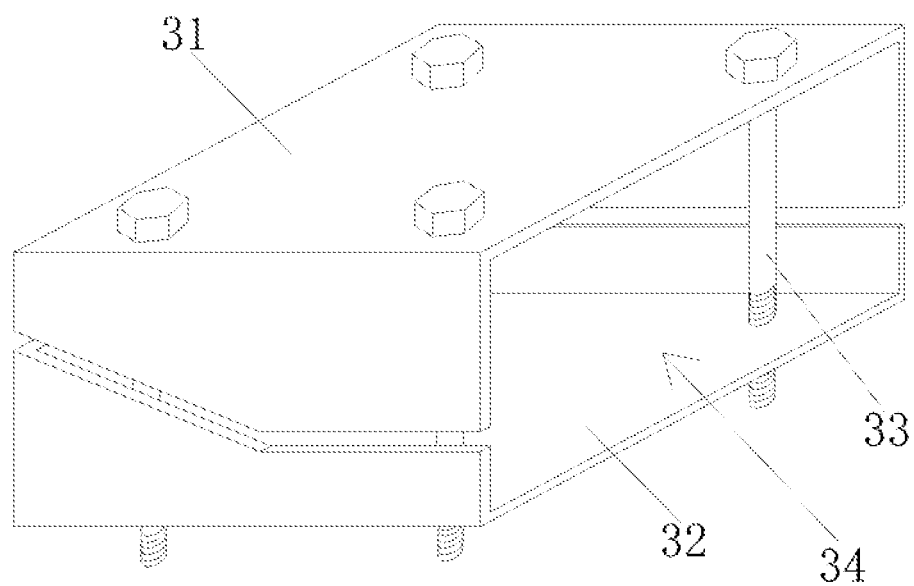
FIG. 7 is a schematic structural view of a first pipeline fixing part in the pipeline annular self-guiding apparatus according to embodiment 1 of the present application.
Figure 8:
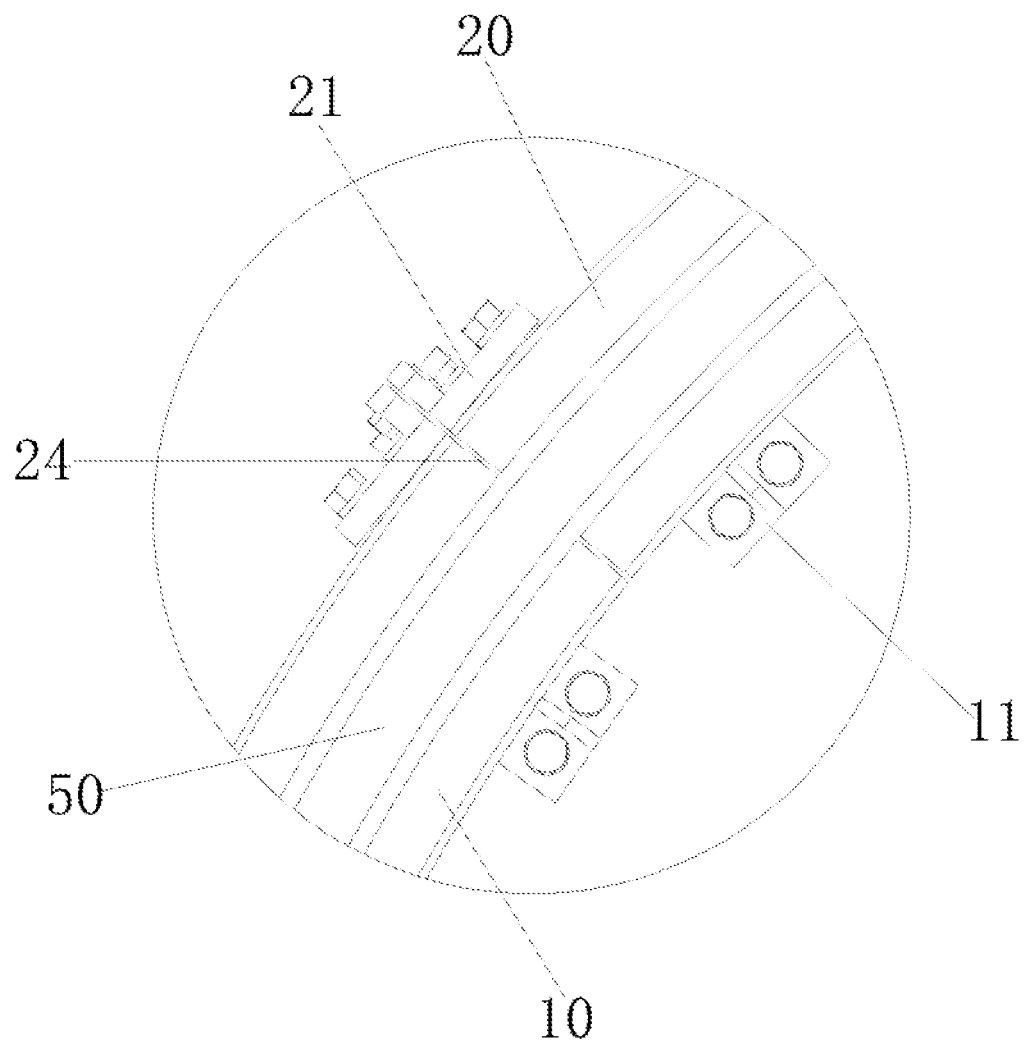
FIG. 8 is an enlarged view of part C of FIG. 2.
Figure 9:
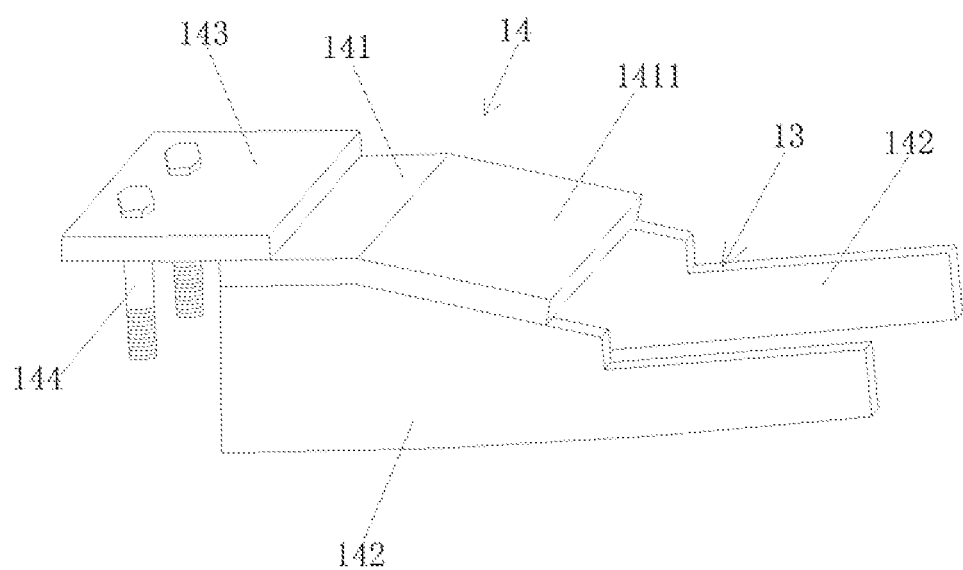
FIG. 9 is a schematic structural view of a stopper of the pipeline annular self-travel guide apparatus according to embodiment 1 of the present application.

According to FIG. 6, a first cutout 13 is defined on an inner wall surface of the inner annular groove 10, the first pipeline fixing part 30 is mounted in the first cutout 13, a second cutout 23 is defined on an outer wall surface of the outer annular groove 20, opposing to the first cutout 13, and the second pipeline fixing part 40 is mounted in the second cutout 23.

In this embodiment, a structure of the first pipeline fixing part 30 is same as a structure of the second pipeline fixing part 40. Specific configurations of both will be described by taking the first pipeline fixing part 30 as an example: according to FIG. 7, the first pipeline fixing part 30 includes an upper pressing plate 31 and a lower pressing plate 32. The upper pressing plate 31 and the lower pressing plate 32 are connected by bolts 33, and a distance between the upper pressing plate 31 and the lower pressing plate 32 can be adjusted by adjusting the bolts 33. The space between the upper pressing plate 31 and the lower pressing plate 32 is the pipeline inlet hole 34. When a hydraulic oil pipeline needs to be inserted into the inner annular groove 10 from the pipeline inlet hole 34, the distance between the upper pressing plate 31 and the lower pressing plate 32 can be increased by screwing the bolt 33. When the hydraulic oil pipeline needs to be fixed at the first pipeline fixing part 30, the distance between the upper pressing plate 31 and the lower pressing plate 32 can be reduced by tightening the bolt 33, so that the hydraulic pipeline is pressed between the upper pressing plate 31 and the lower pressing plate 32.

According to FIG. 6, the lower pressing plate 32 of the first pipeline fixing part 30 is fixed to a bottom of the first cutout 13, and the first cutout 13 has a certain depth radially outward on the inner wall surface of the inner annular groove 10. A bottom surface and left and right sides of the first cutout 13 are communicated with an inside of the inner annular groove 10. The hydraulic oil pipeline passes through the pipeline inlet hole 34 between the lower pressing plate 32 and the upper pressing plate 31 of the first pipeline fixing part 30 from the left side of the first pipeline fixing part 30, and then enters an inside of the inner annular groove 10 from the right side of the first cutout 13.

In this embodiment, each of the inner annular groove 10 and the outer annular groove 20 is formed by butting three arc grooves. The outer annular groove 20 is taken as an example. According to FIG. 8, two sides of a connecting seam 24 are respectively two arc grooves for forming the outer annular groove 20. Each arc groove forming the outer annular groove 20 can be separately fixed on the outer ring of the large bearing of the segment assembling machine to form the integral annular groove, or can be assembled and then fixed on the outer ring of the large bearing of the segment assembling machine.

Further, according to FIG. 6, each of the inner annular groove 10 and the outer annular groove 20 is configured with a stopper 14 on a left side of the first pipeline fixing part 30. The stopper 14 is spliced to an end of one of the arc grooves on the inner annular groove 10. The first cutout 13 is defined on the stopper 14. Specifically, according to FIG. 9, the stopper 14 includes a top plate 141 and two side plates 142. The top plate 141 and the two side plates 142 form a groove shape corresponding to the inner annular groove 10. A rear end of the top plate 141 is a downward bent portion 1411. Downward bent portions 1411 on two stoppers 14 are spaced just so as to prevent the large rollers 70 from passing through and allow the pipeline supporting rollers 60 to pass through and prevent the large rollers 70 from squeezing the hydraulic pipelines on a right side of the stopper 14.

A fixing plate 143 is welded to a front end of the top plate 141, bolts 144 are screwed to the fixing plate 143, and the entire stopper 14 is mounted to an end of a bottom plate of the corresponding arc groove through the bolts 144.

Figure 10:
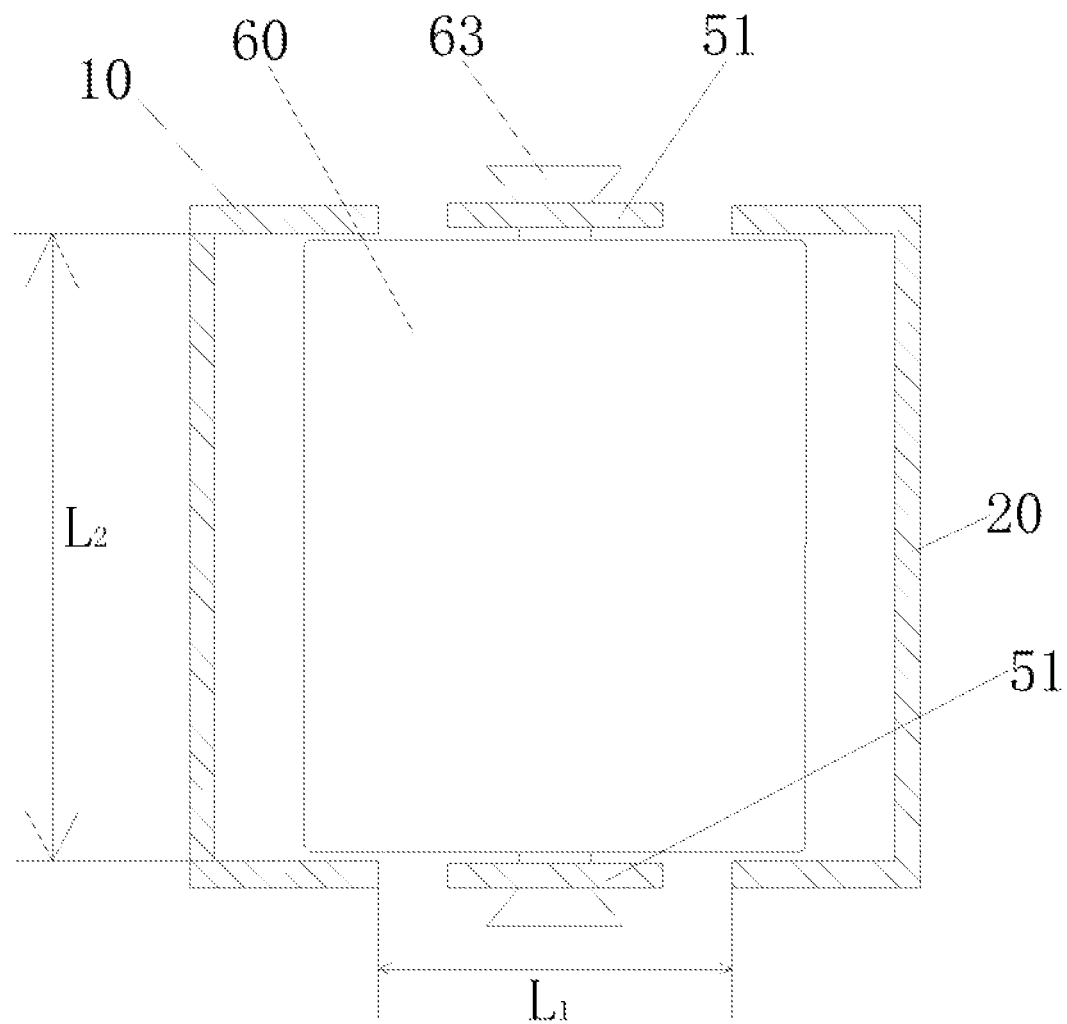
FIG. 10 is a cross-sectional view taken along line A-A of FIG. 2.

Further, according to FIG. 10, an annular bracket 50 includes two coaxially configured supporting rings 51. The supporting rings 51 are made by stamping a spring steel plate with a thickness of 5 mm. A groove width L2 of the inner annular groove 10 is the same as a groove width of the outer annular groove 20. A radial gap is reserved between a side surface of the inner annular groove 10 and a corresponding side surface of the outer annular groove 20 for mounting the supporting rings 51. The radial widths of the supporting rings 51 are smaller than a radial width L1 of the radial gap. The two supporting rings 51 are configured at intervals along an axial direction. Both ends of a rotating shaft of the pipeline supporting roller 60 are respectively mounted on the two supporting rings 51.

The diameter of each pipeline supporting roller 60 is greater than the radial width L1 of the radial gap. An axial width of the pipeline supporting roller 60 is slightly smaller than the groove widths of the inner annular groove 10 and the outer annular groove 20. The pipeline supporting roller 60 is located partially in the inner annular groove 10 and partially in the outer annular groove 20, so that the pipeline supporting roller 60 can better compress the hydraulic oil pipeline located in the gap between the pipeline supporting roller 60 and the inner annular groove 10, and compress the hydraulic oil pipeline located in the gap between the pipeline supporting roller 60 and the outer annular groove 20.

Figure 11:
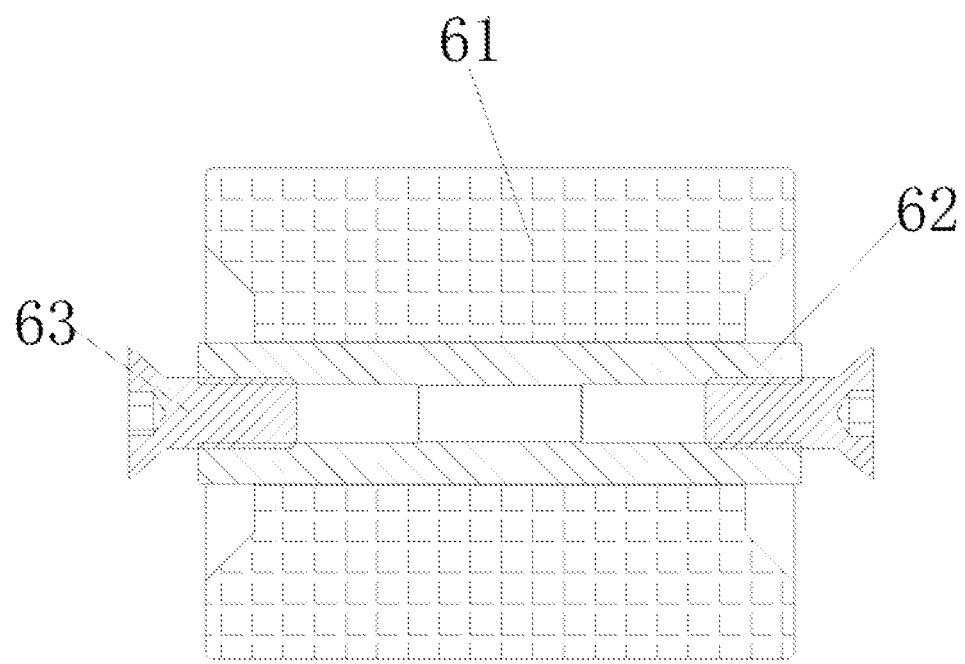
FIG. 11 is a cross-sectional view of a pipeline supporting roller in the pipeline annular self-guiding apparatus according to embodiment 1 of the present application.

According to FIG. 11, the pipeline supporting roller 60 includes a cylindrical roller 61 and a rotating shaft 62. The cylindrical roller 61 has a through hole for receiving the rotating shaft 62. A diameter of the through hole is slightly larger than a diameter of the rotating shaft 62. The cylindrical roller 61 is made of wear-resistant polyurethane, and two ends of the rotating shaft 62 are defined with screw holes. Both ends of the rotating shaft 62 are screwed to corresponding portions of the supporting rings 51 through the socket screws 63.

Embodiment 2

Figure 12:
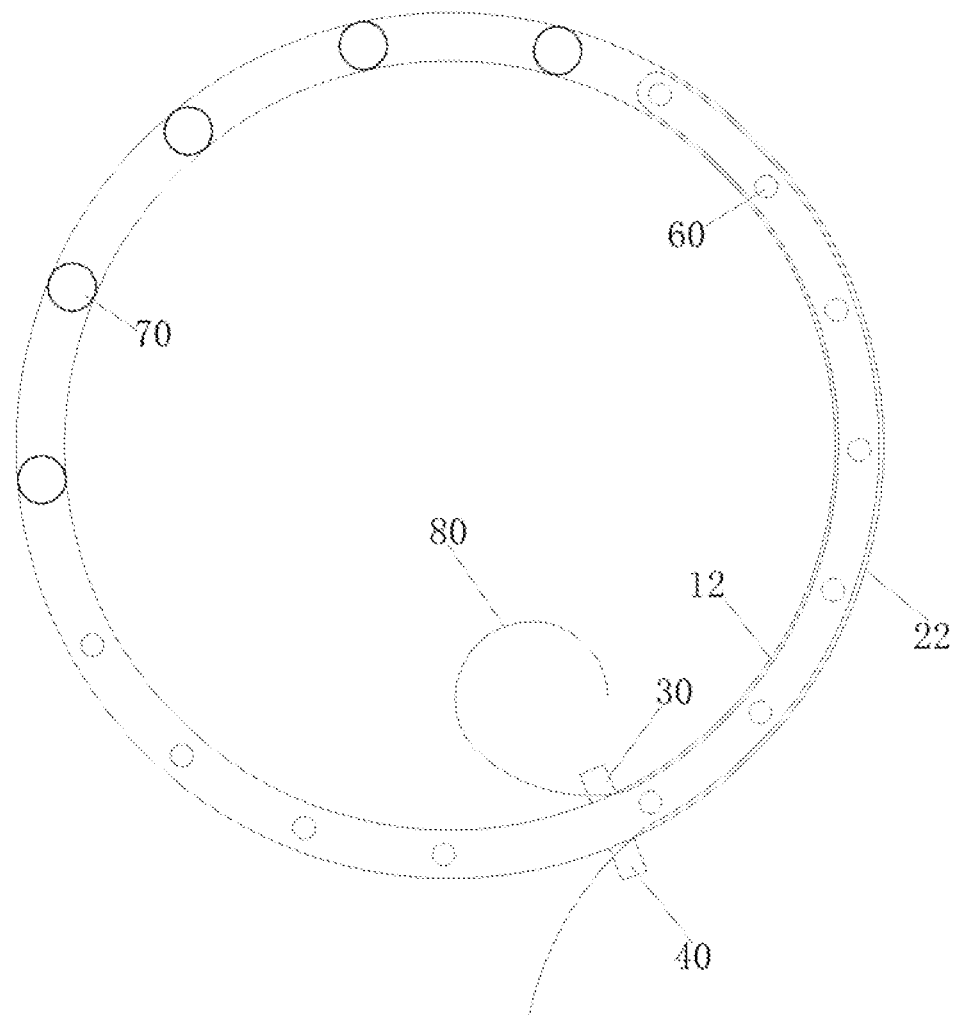
FIG. 12 is a schematic view of coiling of hydraulic oil pipelines in a pipeline annular self-guiding method according to embodiment 2 of the present application.
Figure 13:
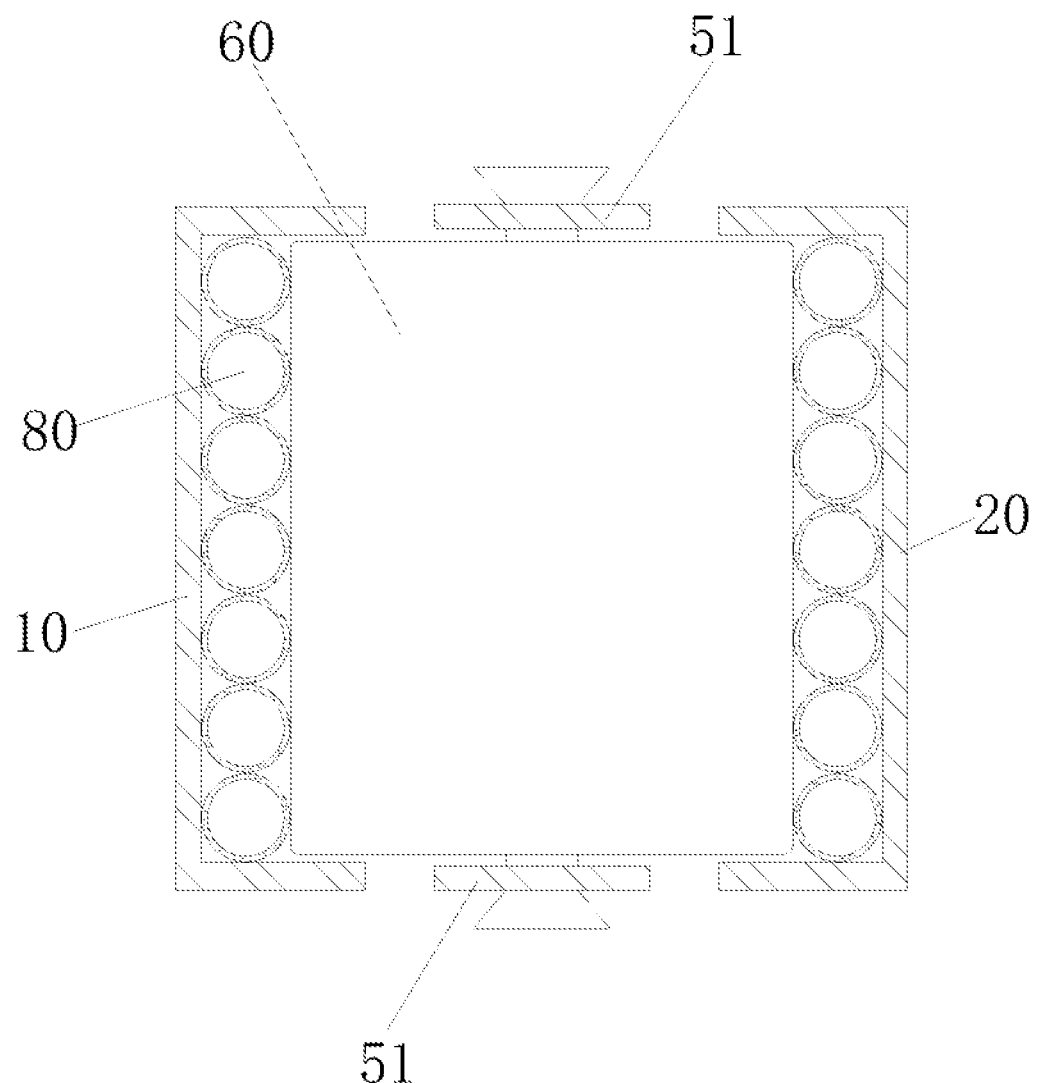
FIG. 13 is a schematic diagram of an arrangement of the hydraulic oil pipelines in the pipeline annular self-guiding method according to embodiment 2 of the present application.
Figure 14:
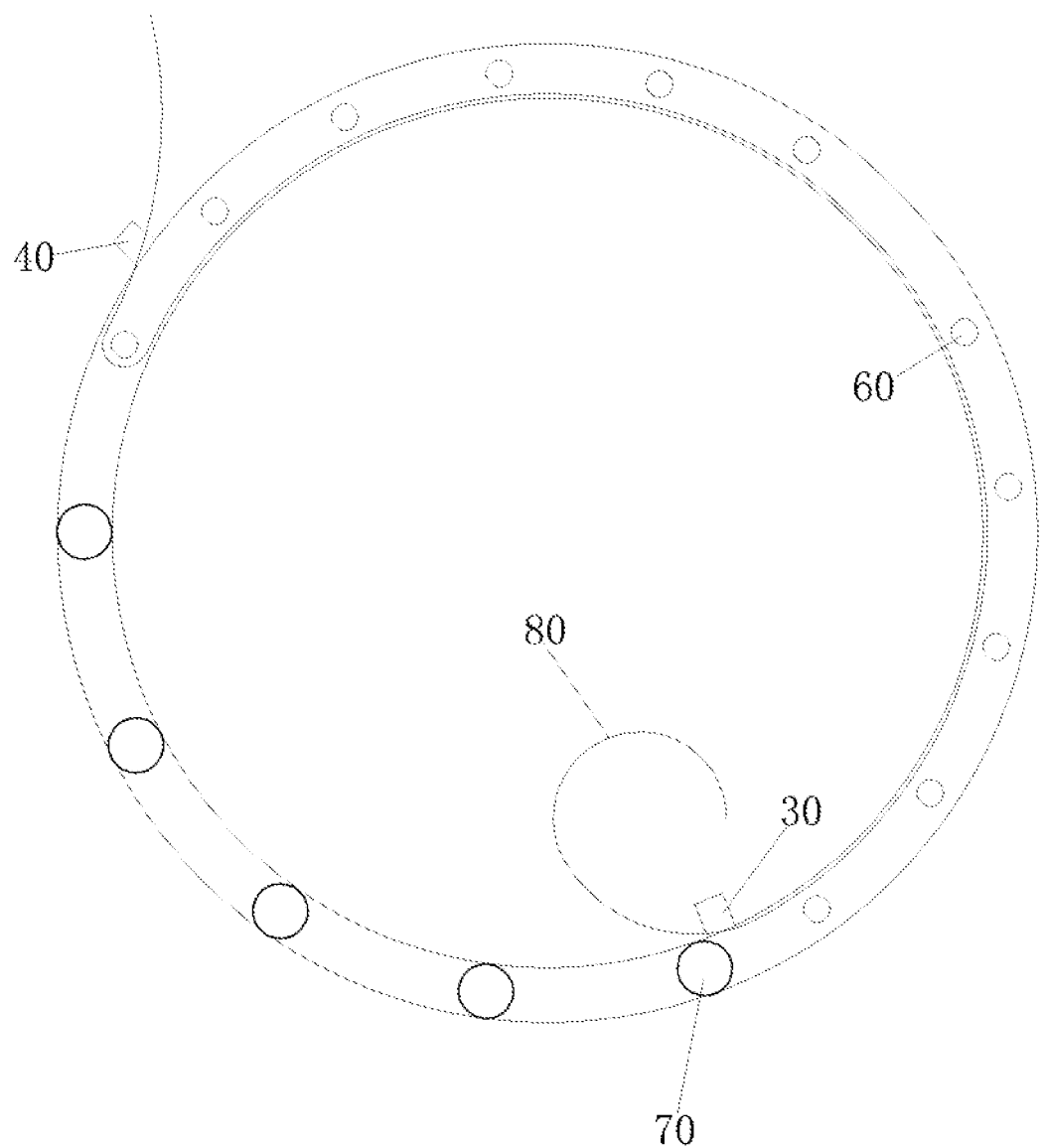
FIG. 14 is a schematic view showing coiling of the hydraulic oil pipelines after an outer annular groove is rotated over a certain angle in the pipeline annular self-guiding method according to embodiment 2 of the present application.

According to FIGS. 12 to 14, a pipeline annular self-guiding method is referred.

The method adopts the pipeline annular self-guiding apparatus in embodiment 1, and specifically includes:

according to FIG. 12, a plurality of hydraulic oil pipelines 80 are inserted into the inner annular groove through the pipeline inlet holes in first pipeline fixing parts 30. Each hydraulic oil pipeline 80 is entered the right side of each first pipeline fixing part 30, and each hydraulic oil pipeline 80 is moved along the gap between seven of the pipeline supporting rollers 60 on the right side of the first pipeline fixing parts 30 and the inner bottom surface 12 of the inner annular groove. Each hydraulic oil pipeline 80 is passed through the seventh pipeline supporting roller 60 on the right side of the first pipeline fixing part 30 and then is folded back. After being folded back, each hydraulic oil pipeline 80 is advanced along the gap between the pipeline supporting rollers 60 and the inner bottom surface 22 of the outer annular groove 20 to a pipeline outlet hole of the second pipeline fixing part 40. Each hydraulic oil pipeline 80 has appropriate lengths reserved outside the pipeline inlet hole and the pipeline outlet hole, and each hydraulic oil pipeline 80 is fixed at the first pipeline fixing part 30 and the second pipeline fixing part 40.

According to FIG. 13, the hydraulic oil pipelines 80 are configured side by side in the gap between the pipeline supporting rollers 60 and the groove bottom surface of the inner annular groove 10, and in the gap between the pipeline supporting rollers 60 and the groove inner bottom surface of an outer annular groove 20.

Further, the inner annular groove 10 is fixed, and the outer annular groove 20 and an annular bracket composed of two supporting rings 51 can freely rotate.

The pipeline annular self-guiding method takes a segment assembling machine as an example, according to FIG. 14, As the outer annular groove 20 rotates counterclockwise following an outer ring of a large bearing of the segment assembling machine, the pipeline supporting roller 60 pushes the portion of the hydraulic oil pipeline 80 between the inner annular groove 10 and the outer annular groove 20 to move accordingly. The first pipeline fixing part 30 does not move, the second pipeline fixing part 40 rotates with each hydraulic cylinder on the segment assembling machine, and a positional relationship between the second pipeline fixing part 40 and each hydraulic cylinder is always unchanged, so that a length of a section of the hydraulic oil pipeline 80 outside the second pipeline fixing part 40 can always be connected to the hydraulic oil cylinder that needs the hydraulic oil pipeline 80 to supply oil.

According to FIG. 14, when a large roller 70 rotates to a left side of the first pipeline fixing part 30, it does not rotate again to avoid squeezing the hydraulic oil pipeline 80. The second pipeline fixing part 40 is rotated from a position in FIG. 12 to a position in FIG. 14 at a rotation angle of 190 degrees, and a clockwise rotation angle of the second pipeline fixing part 40 can also reach 190 degrees, therefor meeting usage requirements of the segment assembling machine of a shield machine.

Specifically, FIGS. 12 and 14 are only schematic and are mainly used to illustrate a winding mode of the hydraulic oil pipeline 80, and do not represent a thickness of the hydraulic oil pipeline 80 or an actual structure and size of the inner annular groove and the outer annular groove.

Detailed description of the present application has been provided above referring drawings and embodiments. However, it will be understood by those skilled in the art that, without departing from an object of the present application, various specific parameters in the above embodiments can be modified to form a plurality of specific embodiments, all of which are within the common range of the present application and will not be described in detail here.

The invention claimed is:

1. A pipeline annular self-guiding apparatus, comprising an inner annular groove and an outer annular groove, the inner annular groove and the outer annular groove being coaxially configured, wherein
a cutout of the outer annular groove is facing radially inward, a cutout of the inner annular groove is facing radially outward, the cutout of the outer annular groove is opposite to the cutout of the inner annular groove;
the inner annular groove is configured with a first pipeline fixing part, the outer annular groove is configured with a second pipeline fixing part, the first pipeline fixing part is configured with a pipeline inlet hole communicated with the inner annular groove, and the second pipeline fixing part is configured with a pipeline outlet hole communicated with the outer annular groove; and
between the inner annular groove and the outer annular groove an annular bracket configured to freely rotate along a circumferential direction is correspondingly configured, a pipeline supporting roller group is configured on the annular bracket, the pipeline supporting roller group comprises a plurality of pipeline supporting rollers configured at intervals along a circumferential direction and is configured to rotate freely by themselves, central axes of the pipeline supporting rollers are parallel to central axes of the inner annular groove and the outer annular groove, and gaps for laying pipelines are reserved between a circumferential surface of the pipeline supporting roller and the groove inner bottom surfaces of the inner annular groove and the outer annular groove.

2. The pipeline annular self-guiding apparatus according to claim 1, wherein, the annular bracket is also configured with a large roller group, the large roller group comprises a plurality of large rollers configured at intervals along a circumferential direction and is configured to rotate freely, central axes of the large rollers are parallel to the central axes of the inner annular groove and the outer annular groove, and a circumferential surface of the large rollers are attached to inner bottom surfaces of the inner annular groove and the outer annular groove.

3. The pipeline annular self-guiding apparatus according to claim 2, wherein the inner annular groove and/or the outer annular groove are configured with a stopper for preventing the large roller from passing through but not preventing the pipeline supporting rollers from passing through, and the stopper is located beside the first pipeline fixing part and is located on an opposite side of a penetrating pipeline.

4. The pipeline annular self-guiding apparatus according to claim 1, wherein the annular bracket comprises two coaxially configured supporting rings, the two supporting rings are configured at intervals along the axial direction, and two ends of the rotating shaft of the pipeline supporting rollers are respectively correspondingly installed on the two supporting rings.

5. The pipeline annular self-guiding apparatus according to claim 4, wherein groove widths of the inner annular groove and the outer annular groove are the same, a radial gap for installing the supporting rings is reserved between a side surface of the inner annular groove and a side surface corresponding to the outer annular groove, and a radial width of the supporting rings is smaller than a radial width of the radial gap.

6. The pipeline annular self-guiding apparatus according to claim 5, wherein diameters of the pipeline supporting rollers are larger than the radial width of the radial gap, an axial width of the pipeline supporting rollers are slightly smaller than the groove widths of the inner annular groove and the outer annular groove, and the pipeline supporting rollers are locally located in the inner annular groove and locally located in the outer annular groove.

7. The pipeline annular self-guiding apparatus according to claim 1, wherein a first cutout is configured on an inner wall surface of the inner annular groove, a second cutout is configured on an outer wall surface of the outer annular groove, and the second cutout is located on an opposite side of the first cutout, and the first pipeline fixing part is installed on the first cutout, and the second pipeline fixing part is installed on the second cutout.

8. The pipeline annular self-guiding apparatus according to claim 7, wherein the first pipeline fixing part and the second pipeline fixing part both comprise an upper pressing plate and a lower pressing plate, the upper pressing plate and the lower pressing plate are connected by bolts, and a distance between the upper pressing plate and the lower pressing plate is configured to be adjusted by screwing the bolts; the lower pressing plate of the first pipeline fixing part is fixed at a bottom of the first cutout, and the first cutout has a certain depth radially outward on the inner wall surface of the inner annular groove for penetrating the pipeline from between the lower pressing plate and the upper pressing plate of the first pipeline fixing part to a side of the first cutout; the lower pressing plate of the second pipeline fixing part is fixed at a bottom of the second cutout, and the second cutout has a certain depth inward along a radial direction on the outer wall surface of the outer annular groove, so as to penetrate the pipeline from a side surface of the second cutout to a space between the lower pressing plate and the upper pressing plate of the second pipeline fixing part.

9. The pipeline annular self-guiding apparatus according to claim 1, wherein the inner annular groove and the outer annular groove are butted by a plurality of arc grooves.

10. A pipeline annular self-guiding method, wherein the method adopts the pipeline annular self-guiding apparatus according to claim 1, and the method comprises:
- conducting a plurality of pipelines into the inner annular groove through the pipeline inlet hole, conducting each of the pipelines to move forward along a gap between the pipeline supporting rollers and a groove bottom surface of the inner annular groove to pass by some of the pipeline supporting rollers and then fold back, and after the pipelines are folded back, conducting each of the pipelines moved forward along a gap between the pipeline supporting rollers and a groove bottom surface of the outer annular groove to a pipeline exit hole and out from the pipeline exit hole;
- configuring each of the pipelines side by side in the gap between the pipeline supporting rollers and the groove bottom surface of the inner annular groove, and in a gap between the pipeline supporting roller and the bottom surface of the outer annular groove;
- reserving appropriate lengths for each pipeline outside the pipeline inlet hole and a pipeline outlet hole; and
- fixing each of the pipelines at the first pipeline fixing part and the second pipeline fixing part;

wherein the inner annular groove is fixed, and the outer annular groove and the annular bracket are rotatable freely.

\* \* \* \* \*